(12) United States Patent
Asaoka et al.

(10) Patent No.: US 8,482,702 B2
(45) Date of Patent: *Jul. 9, 2013

(54) REFLECTION TYPE LIQUID CRYSTAL DISPLAY DEVICE WITH CONTROLLED DIRECTORS

(75) Inventors: Yasushi Asaoka, Osaka (JP); Eiji Satoh, Osaka (JP); Kiyoshi Minoura, Osaka (JP); Sayuri Fujiwara, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 232 days.

This patent is subject to a terminal disclaimer.

(21) Appl. No.: 13/060,569

(22) PCT Filed: Aug. 21, 2009

(86) PCT No.: PCT/JP2009/004008
§ 371 (c)(1),
(2), (4) Date: Feb. 24, 2011

(87) PCT Pub. No.: WO2010/023851
PCT Pub. Date: Mar. 4, 2010

(65) Prior Publication Data
US 2011/0157529 A1    Jun. 30, 2011

(30) Foreign Application Priority Data
Aug. 25, 2008   (JP) .................................. 2008-215682

(51) Int. Cl.
*G02F 1/1335* (2006.01)
*G02F 1/1337* (2006.01)

(52) U.S. Cl.
USPC ............ 349/113; 349/129; 349/123; 349/125

(58) Field of Classification Search
USPC .................... 349/113, 129, 123, 125
See application file for complete search history.

(56) References Cited

U.S. PATENT DOCUMENTS 4,688,900 A * 8/1987 Doane et al. .................... 349/87
5,301,046 A   4/1994 Konuma et al.
(Continued)

FOREIGN PATENT DOCUMENTS
EP     0 626 607 A2   11/1994
JP     06-118398       4/1994
(Continued)

OTHER PUBLICATIONS

International Preliminary Report on Patentability mailed Mar. 17, 2011 in corresponding PCT Application No. PCT/JP2009/004008.

(Continued)

*Primary Examiner* — Mike Qi
(74) *Attorney, Agent, or Firm* — Nixon & Vanderhye, P.C.

(57) ABSTRACT

A liquid crystal display device includes a liquid crystal layer 1 whose state is switchable between a light-transmitting state and a light-scattering state, a front substrate 3 and a rear substrate 2 between which the liquid crystal layer 1 is held, a pair of electrodes 4, 8 between which the liquid crystal layer 1 is interposed and which are configured to apply a voltage across the liquid crystal layer 1, and first and second alignment films 13, 12 respectively provided between the liquid crystal layer 1 and the front substrate 3 and between the liquid crystal layer 1 and the rear substrate 2. The liquid crystal layer 1 includes, in each of the pixels, a continuous wall 10, a plurality of small sections 14 separated by the wall 10, and a plurality of liquid crystal regions 11, each of which is formed in any one of the plurality of small sections 14. The plurality of liquid crystal regions 11 include first and second liquid crystal regions 11 which have directors 20 in a plane parallel to the liquid crystal layer 1. The directors 20 of the first and second liquid crystal regions 11 are oriented in different directions.

15 Claims, 6 Drawing Sheets

U.S. PATENT DOCUMENTS

| | | | |
|---|---|---|---|
| 5,680,188 A | 10/1997 | Yoshida et al. | |
| 5,691,790 A * | 11/1997 | Havens et al. | 349/113 |
| 6,483,643 B1 * | 11/2002 | Zuchowski | 359/443 |
| 7,023,600 B2 * | 4/2006 | Mallya et al. | 359/238 |
| 7,151,582 B2 | 12/2006 | Yoshida et al. | |
| 8,314,909 B2 * | 11/2012 | Asaoka et al. | 349/123 |
| 2002/0001053 A1 | 1/2002 | Nakao et al. | |
| 2005/0275773 A1 * | 12/2005 | Fujiwara et al. | 349/113 |
| 2010/0279125 A1 * | 11/2010 | Buyuktanir et al. | 428/432 |
| 2010/0302488 A1 * | 12/2010 | Asaoka et al. | 349/123 |
| 2011/0249221 A1 * | 10/2011 | Uchida et al. | 349/65 |

FOREIGN PATENT DOCUMENTS

| | | |
|---|---|---|
| JP | 06-175113 | 6/1994 |
| JP | 10-003072 | 1/1998 |
| JP | 10-319375 | 12/1998 |
| JP | 2000-098354 | 4/2000 |
| JP | 2000098354 A * | 4/2000 |
| JP | 2000-206515 | 7/2000 |
| JP | 2007-041429 | 2/2007 |
| JP | 2008-096939 | 4/2008 |

OTHER PUBLICATIONS

International Search Report for PCT/JP2009/004008, mailed Sep. 15, 2009.

* cited by examiner

VOLTAGE: OFF
WHITE DISPLAY (b)

VOLTAGE: ON
BLACK DISPLAY

REFLECTION TYPE LIQUID CRYSTAL DISPLAY DEVICE WITH CONTROLLED DIRECTORS

This application is the U.S. national phase of International Application No. PCT/22009/004008, filed 21 Aug. 2009, which designated the U.S. and claims priority to Japanese Application No. 2008-215682, filed 25 Aug. 2008, the entire contents of each of which are hereby incorporated by reference.

TECHNICAL FIELD

The present invention relates to a reflection-type liquid crystal display device.

BACKGROUND ART

In conventional reflection-type liquid crystal display devices, display modes such as TN (Twisted Nematic) mode and STN (Super Twisted Nematic) mode are used. However, when such a display mode is used, it is necessary to provide polarizers over the surfaces of the liquid crystal panel, and absorption of light by the polarizers disadvantageously decreases the light utilization efficiency.

A newly-proposed display mode which does not require the use of polarizers is a mode in which display is performed by switching the liquid crystal layer by application of a voltage across the liquid crystal layer between a light-scattering state in which light is scattered by the liquid crystal layer and a light-transmitting state in which light is transmitted through the liquid crystal layer (hereinafter, referred to as "scattering-transmitting mode"). In this display mode, for example, a Polymer Dispersed Liquid Crystal (PDLC) is used.

A liquid crystal layer which uses a PDLC (PDLC layer) includes a plurality of liquid crystal regions (or "liquid crystal droplets") dispersed in a polymer material. The liquid crystal regions are formed in spaces defined by polymer walls (hereinafter, referred to as "small sections"). In the PDLC having such a structure, when no voltage is applied (i.e., in the absence of an applied voltage), there is a difference in refractive index between the liquid crystal in the liquid crystal regions and the polymer, so that light is scattered by the interfaces between the liquid crystal regions and the polymer, resulting in a white display state. When a voltage is applied across the PDLC layer (i.e., in the presence of an applied voltage), the alignment of the liquid crystal changes so that the liquid crystal and the polymer have generally equal refractive indexes, allowing light to be transmitted through the PDLC layer. If, in this situation, there is a light-absorbing plate on the rear side of the liquid crystal layer, the transmitted light is absorbed by the light-absorbing plate, resulting in a black display state.

In place of the light-absorbing plate, a reflective layer which is configured to selectively reflect light of a specific color may be provided on the rear side of the liquid crystal layer. For example, when the PDLC layer is a forward-scattering type liquid crystal layer, display can be performed with a specific color and black (mirror reflection) by providing, for example, a smooth metal plate (mirror) which shows the specific color. When the PDLC layer is a backward-scattering type liquid crystal layer, display can be performed with a specific color and white by providing, for example, a metal plate which shows the specific color.

Alternatively, a retroreflective layer may be provided on the rear side of the liquid crystal layer. For example, Patent Document 1 discloses a display device which is based on a combination of a retroreflective layer and a PDLC (retroreflection-type liquid crystal display device). Hereinafter, the structure of a conventional display device which uses a PDLC is described with an example of the retroreflection-type liquid crystal display device.

Figure 11:
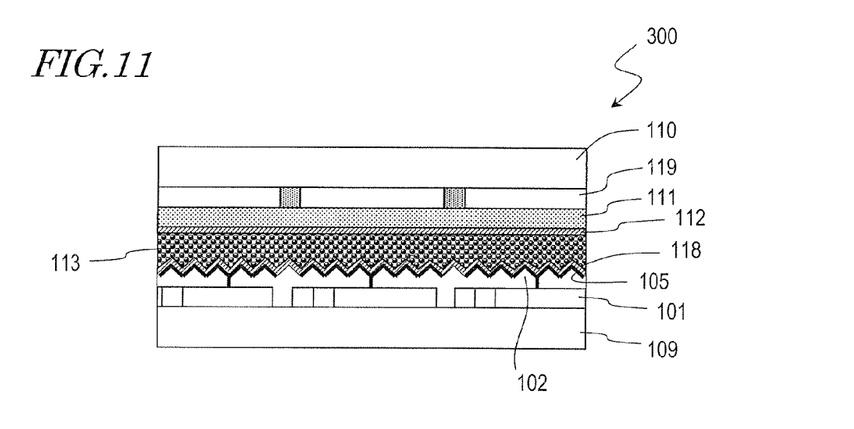
FIG. 11 A cross-sectional view showing an example of a conventional display device which uses PDLC.

FIG. 11 is a schematic cross-sectional view of an active matrix driven retroreflection-type liquid crystal display device disclosed in Patent Document 1. The display device 300 includes a front substrate 110 that includes a color filter 119, a transparent counter electrode 111, and an alignment film 112, a rear substrate 109 that is arranged to oppose the front substrate 110, and a liquid crystal layer (PDLC layer) 113 that is interposed between these substrates 110, 109. The rear substrate 109 includes a plurality of switching elements (TFT) 101, an insulating layer 102 overlying the switching elements 101, which has a surface structure that exhibits a retroreflection property, a plurality of reflective electrodes 105, and an alignment film 118. The reflective electrodes 105 are provided on the insulating layer 102 and have elevations and recesses which are in conformity with the surface shape of the insulating layer 102. The plurality of reflective electrodes 105 are arranged in respective ones of the pixels, each of which is a unit of displaying of images, such that they are mutually separated. Each of the reflective electrodes 105 is coupled to the drain electrode of a corresponding one of the switching elements 101 via a contact hole formed in the insulating layer 102. The alignment film 118 is provided over the insulating layer 102 and the reflective electrodes 105 and has elevations and recesses which are in conformity with the surface shape of the insulating layer 102.

Next, an operation of the display device 300 is described.

In the display device 300, the liquid crystal layer 113 is switchable between a light-transmitting state in which light is transmitted through the liquid crystal layer and a light-scattering state in which light is scattered by the liquid crystal layer (forward scattering and backward scattering) by varying a voltage applied between the counter electrode 111 and the reflective electrodes 105. When the liquid crystal layer 113 is controlled to be in a light-transmitting state, light incoming from a light source outside the display device or from an environment is transmitted through the front substrate 110 and the liquid crystal layer 113 and then reflected by the reflective electrodes 105 to travel back to the side it came from. Here, an image that reaches a viewer from the display device is the eyes of the viewer, so that a "black" display state is obtained.

When the liquid crystal layer 113 is controlled to be in a light-scattering state, light incoming from a light source or environment impinges on the liquid crystal layer 113 at the front substrate 110 side and is then scattered by the liquid crystal layer 113. When the liquid crystal layer 113 is a forward-scattering type liquid crystal layer, the scattered light is reflected by the reflective electrodes 105 and, then, the reflected light travels through the liquid crystal layer 113, which is in a light-scattering state, and outgoes toward the viewer. Due to scattering of light by the liquid crystal layer 113, the retroreflection property of the reflective electrodes 105 is canceled so that incoming light cannot travel back to the side it came from. Thus, a "white" display state is obtained.

Note that, although the display device 300 shown in FIG. 11 includes the reflective electrodes 105 which function as both the retroreflective layer and the pixel electrodes, the retroreflective layer may be a separate component from the pixel electrodes. The retroreflective layer may be interposed between the pixel electrodes and the rear substrate 109 or may be provided on the rear side of the rear substrate 109.

A reflection-type liquid crystal display device which uses a scattering-transmitting mode, such as the display device 300, disadvantageously has a lower display contrast than display devices which use other display modes.

To increase the brightness of the white display state of the display device 300, it is necessary to increase the thickness of the liquid crystal layer 113 so that light impinging on the liquid crystal layer 113 can be scattered more assuredly. However, when the thickness of the liquid crystal layer 113 is increased, a higher voltage needs to be applied across the liquid crystal layer 113 for switching the liquid crystal layer 113 to a light-transmitting state. If the voltage applied across the liquid crystal layer 113 is insufficient, the transmittance of the liquid crystal layer 113 decreases, so that a high quality black display state cannot be obtained.

Patent Documents 2 to 4 disclose a technique of improving the display contrast by controlling liquid crystal directors in a guest-host mode liquid crystal display device which uses a PDLC that contains a dichromatic dye in a liquid crystal. In these patent documents, the liquid crystal regions are deformed to expand along a plane of the substrate to have an oblate shape, so that the directors of liquid crystal molecules in the absence of an applied voltage across the liquid crystal layer can be controlled to be oriented parallel with the substrate. For example, Patent Documents 2 and 3 disclose a technique of mechanically pressing the liquid crystal layer such that the liquid crystal droplets have an oblate shape which is elongated along a direction parallel with the substrate. Patent Document 4 discloses a technique of imposing a shear stress in parallel with the substrate in formation of the liquid crystal layer and a technique of curing only superficial part of the liquid crystal layer.

With the techniques of Patent Documents 2 to 4, the display contrast can be improved without increasing the thickness of the liquid crystal layer. More specifically, in a conventional liquid crystal layer which includes a PDLC, the liquid crystal directors in the liquid crystal regions are oriented in random directions in the absence of an applied voltage. When a voltage is applied, these liquid crystal directors are oriented perpendicular to the substrate. On the other hand, in the techniques of Patent Documents 2 to 4, the liquid crystal directors can be controlled to be oriented parallel to the substrate in the absence of an applied voltage, and therefore, the difference between light absorption achieved in the absence of an applied voltage and light absorption achieved in the presence of an applied voltage (when the liquid crystal directors are perpendicular to the substrate) can be increased. As a result, the display contrast can be improved as compared with the conventional example.

CITATION LIST

Patent Literature

Patent Document 1: Japanese Laid-Open Patent Publication No. 2006-23721
Patent Document 2: Japanese Laid-Open Patent Publication No. 5-80302
Patent Document 3: Japanese Laid-Open Patent Publication No. 7-181454
Patent Document 4: Japanese Laid-Open Patent Publication No. 10-319375

SUMMARY OF INVENTION

Technical Problem

The present inventor conducted researches and found that, when the techniques disclosed in Patent Documents 2 to 4 are employed, the liquid crystal directors of the liquid crystal layer 113 of the display device 300 shown in FIG. 11 can be controlled.

However, even when the above-described techniques are employed, the brightness of the white display state of the liquid crystal layer 113 cannot be sufficiently improved. According to the techniques disclosed in Patent Documents 2 to 4, the liquid crystal regions have an oblate shape, and therefore, it is difficult to arrange the liquid crystal regions in a substrate plane at a high density. Therefore, there is a probability that the scattering intensity of the liquid crystal layer cannot be sufficiently increased. Also, only one liquid crystal region can be provided with respect to the thickness direction of the liquid crystal layer (one-layer structure), and therefore, there is a probability that the scattering property decreases as compared with the conventional liquid crystal layer.

In a liquid crystal layer which is formed using the techniques disclosed in Patent Documents 2 to 4, the liquid crystal regions are deformed in one direction to have an oblate shape, and therefore, the azimuthal dependence of the viewing angle characteristics in the white display state is large. Also, the process of forming the liquid crystal layer disadvantageously becomes hugely complicated.

The present invention was conceived in view of the above circumstances. One of the objects of the present invention is to provide a reflection-type liquid crystal display device that includes a liquid crystal layer switchable between a light-scattering state and a light-transmitting state, in which the scattering efficiency of the liquid crystal layer in a light-scattering state is improved so that a brighter white display state can be achieved than in the conventional device. Another object is decrease the driving voltage to a low level while maintaining the brightness of the white display state.

Solution to Problem

A reflection-type liquid crystal display device of the present invention is a liquid crystal display device having a plurality of pixels, including: a liquid crystal layer whose state is switchable between a light-transmitting state in which light is transmitted through the liquid crystal layer and a light-scattering state in which light is scattered by the liquid crystal layer; a front substrate and a rear substrate between which the liquid crystal layer is held; a pair of electrodes between which the liquid crystal layer is interposed and which are configured to apply a voltage across the liquid crystal layer; and first and second alignment films respectively provided between the liquid crystal layer and the front substrate and between the liquid crystal layer and the rear substrate, wherein the liquid crystal layer includes, in each of the pixels, a continuous wall, a plurality of small sections separated by the wall, and a plurality of liquid crystal regions, each of which is formed in any one of the plurality of small sections, and the plurality of liquid crystal regions include first and second liquid crystal regions which have directors in a plane parallel to the liquid crystal layer, and the directors of the first and second liquid crystal regions are oriented in different directions.

In a preferred embodiment, another small section does not intervene between each of the plurality of small sections and one of the first and second alignment films which is closer to the each small section.

In a preferred embodiment, another small section does not intervene between each of the plurality of small sections and the first and second alignment films.

It is preferred that each of the plurality of liquid crystal regions is in contact with any one of the first and second alignment films.

It is preferred that the first and second alignment films are not provided with an alignment treatment.

In a preferred embodiment, a surface free energy of the first and second alignment films is not less than 44 mJ/m$^2$ and not more than 50 mJ/m$^2$.

The liquid crystal layer may include the small sections in each of the pixels at the density of 0.016 sections/μm$^2$ or higher. The liquid crystal layer may include the small sections in each of the pixels at the density of 1 section/μm$^2$ or higher.

It is preferred that a dielectric anisotropy of a liquid crystal material of the liquid crystal layer is positive.

It is preferred that the liquid crystal region does not contain a chiral agent.

It is preferred that the plurality of small sections have a diameter not less than 0.6 μm and not more than 6 μm.

It is preferred that a difference between an extraordinary refractive index no and an ordinary refractive index no of the liquid crystal material included in the liquid crystal region is not less than 0.1 and not more than 0.3.

In a preferred embodiment, the above-described reflection-type liquid crystal display device further includes a reflective layer which is provided on a rear side of the liquid crystal layer. The reflective layer may be a retroreflective layer.

In a preferred embodiment, the above-described reflection-type liquid crystal display device further includes a light-absorbing layer which is provided on a rear side of the liquid crystal layer.

Advantageous Effects of Invention

According to the present invention, in a reflection-type liquid crystal display device which includes a liquid crystal layer whose state is switchable between a light-scattering state and a light-transmitting state, the scattering efficiency of the liquid crystal layer in the light-scattering state can be improved without increasing the azimuth dependence of the viewing angle characteristics. Therefore, the brightness of a white display state can be improved, and thus, the contrast ratio of display can be improved. Alternatively, by decreasing the thickness of the liquid crystal layer, the driving voltage can be decreased to a low level while maintaining the brightness of the white display state.

In the present invention, the directors of the liquid crystal regions are controlled by the alignment films. Therefore, the liquid crystal regions can be arranged in the liquid crystal layer at a higher density than in a conventional technique in which the directors are controlled according to the shape of the liquid crystal regions (the shape of the small sections). As a result, the scattering characteristic of the liquid crystal layer can be improved more effectively.

According to the present invention, a reflection-type liquid crystal display device such as described above can be manufactured using a simple method without increasing the complexity of the manufacturing process.

BRIEF DESCRIPTION OF DRAWINGS

FIG. 1 (a) is a cross-sectional view schematically showing a liquid crystal display device of an embodiment of the present invention. (b) is a cross-sectional view of the liquid crystal display device taken along line Ib-Ib' of (a), schematically showing a liquid crystal layer in a single pixel.

FIGS. 2 (a) and (b) are schematic diagrams for illustrating the display principles of the liquid crystal display device of the embodiment of the present invention. (a) and (b) are cross-sectional views which illustrate examples of the alignment of liquid crystal molecules in a liquid crystal region in the absence and presence of an applied voltage across the liquid crystal layer.

FIGS. 3 (a) and (b) are schematic cross-sectional views showing examples of the alignment of liquid crystal molecules in the display device of the present embodiment, in the absence of an applied voltage and in the presence of an applied voltage, respectively.

FIGS. 4 (a) and (b) are schematic cross-sectional views showing examples of the alignment of liquid crystal molecules in a conventional display device, in the absence of an applied voltage and in the presence of an applied voltage, respectively.

DESCRIPTION OF EMBODIMENTS

In a reflection-type liquid crystal display device of the present invention, at least two liquid crystal regions which have directors in a plane parallel to the liquid crystal layer are included in one pixel. The directors of these liquid crystal regions are oriented in different directions from one another.

According to the present invention, the directors of the liquid crystal regions are in a plane parallel to the liquid crystal layer. Therefore, in a light-scattering state (white display state), the difference in refractive index between the liquid crystal regions and the walls that separate the liquid crystal regions is the maximum, so that brighter display can be realized. Alternatively, the thickness of the liquid crystal layer can be decreased while the display brightness is maintained. As a result, the driving voltage can be decreased to a low level.

Since the directors of the plurality of liquid crystal regions are oriented in different directions, the azimuthal dependence of the scattering direction decreases so that the azimuthal dependence of the viewing angle in a light-scattering state (white display state) can be decreased.

The above-described structure can be realized by adjusting the surface energy of the alignment films provided on the front substrate side and the rear substrate side of the liquid crystal layer. Therefore, the above-described structure can be manufactured through a simpler process than the technique of mechanically deforming the liquid crystal regions to have an oblate shape as described in Patent Documents 1 to 3.

According to the techniques of Patent Documents 2 to 4, the liquid crystal regions are deformed to have an oblate shape, so that the size of the liquid crystal regions in a plane (the size of the liquid crystal regions when seen in a direction normal to the substrate) increases. Therefore, the liquid crystal regions cannot be arranged in a plane at a high density. On the other hand, according to the present invention, the size of the liquid crystal regions in a plane can be decreased because the directors of the liquid crystal regions are controlled using the alignment films. As a result, the density of the liquid crystal regions in a plane can be increased, and the scattering efficiency can also be increased. Further, the directors of the liquid crystal regions can be controlled without greatly deforming the liquid crystal regions. Therefore, the azimuthal dependence of the viewing angle characteristics can be decreased.

Hereinafter, a preferred embodiment of a liquid crystal display device of the present invention is described with reference to FIG. 1 and FIG. 2.

FIG. 1(a) is a cross-sectional view schematically showing the liquid crystal display device of the embodiment of the present invention. FIG. 1(b) is a schematic view for illustrating a structure of a liquid crystal layer when a voltage is not applied across the liquid crystal layer (in the absence of an applied voltage), showing a cross section that is parallel to substrates. FIGS. 2(a) and 2(b) are schematic cross-sectional views showing examples of alignment of liquid crystal molecules in a liquid crystal region when a voltage is not applied across the liquid crystal layer (in the absence of an applied voltage) and when a voltage is applied across the liquid crystal layer (in the presence of an applied voltage).

First, refer to FIG. 1(a). The liquid crystal display device 100 includes a front substrate 3, a rear substrate 2 provided so as to oppose the front substrate 3, a liquid crystal layer 1 provided between these substrates 2, 3, and a retroreflective layer 16 provided on the rear side of the rear substrate 2. The retroreflective layer 16 has, for example, a corner cube array shape.

A surface of the rear substrate 2 on the liquid crystal layer side is provided with a plurality of switching elements (herein, thin film transistors) 5, a plurality of transparent pixel electrodes 4, and an alignment film 12 in this order. In the present embodiment, the alignment film 12 is a horizontal alignment film and is in contact with the rear side surface of the liquid crystal layer 1. The plurality of pixel electrodes 4 are mutually separated to define pixels, each of which is a unit of displaying of images. In the present embodiment, these pixel electrodes 4 are in a matrix arrangement and are each electrically coupled to the source electrode (not shown) of a corresponding one of the thin film transistors 5.

On the other hand, a surface of the front substrate 3 on the liquid crystal layer side is provided with color filters 6 of, for example, R (red), G (green), and B (blue) which are arranged so as to correspond to the pixel electrodes 4, a planarization film 7 covering the color filters 6 to provide a flat surface, a transparent counter electrode 8, and an alignment film 13 in this order. The alignment film 13 is in contact with the front side surface of the liquid crystal layer 1. In the present embodiment, the alignment film 13 is also a horizontal alignment film as the alignment film 12 is. The alignment films 12, 13 are not provided with an alignment treatment, such as a rubbing treatment.

The liquid crystal layer 1 is divided by walls 10 into a plurality of small sections 14. In each of the small sections 14, a liquid crystal region 11 is formed. The walls 10 are made of, for example, a polymer. Note that, although in FIG. 1(a) the walls 10 and the alignment films 12, 13 surround the spaces that constitute the small sections 14, only the walls 10 may surround the spaces that constitute the small sections 14.

As seen from FIG. 1(b), at least two small sections are provided in each pixel, and the walls 10 are continuous. The liquid crystal regions 11 in these small sections 14 have directors 20 in a plane that is parallel to the liquid crystal layer 1. The directors 20 of the liquid crystal regions 11 are oriented in random directions in the plane. Note that, in the present embodiment, at least two liquid crystal regions 11 which have directors 20 in the plane and of which the orientations of the directors 20 are mutually different may be provided in one pixel, although in the example shown in the drawing all the liquid crystal regions 11 have directors 20 which are oriented in random directions in a plane.

Now, the display principles of the liquid crystal display device 100 are described with reference to FIGS. 2(a) and 2(b). For the sake of simplicity, the components provided in the respective substrates 2, 3 except for the alignment films 12, 13 are not shown in these drawings.

As shown in FIG. 2(a), in the absence of an applied voltage, part of the liquid crystal molecules 22 in the liquid crystal region 11 are affected by the alignment films 12, 13 to be oriented in parallel. Another part of the liquid crystal molecules 22 in the liquid crystal region 11 are affected by the walls 10 to incline. However, the liquid crystal molecules 22 in the liquid crystal region 11 fall in an alignment which is generally uniform in a plane parallel to the substrate surface such that no disinclination occurs in the liquid crystal region 11. As a result, the alignment of the liquid crystal molecules 22 in the liquid crystal region 11 is continuous so that the liquid crystal molecules 22 in the liquid crystal region 11 constitute a mono-domain in which the alignment orientation is represented by one director 20. In the shown example, the liquid crystal molecules 22 in the liquid crystal region 11 are aligned along lines extending between the opposite ends or "poles" of the liquid crystal region 11. Therefore, the alignment vector (director) 20 of the liquid crystal region 11 is parallel to lines extending between the poles at the opposite ends in a plane parallel to the substrates 2, 3.

Here, the refractive index of the liquid crystal region 11 can have various values between the ordinary refractive index no and extraordinary refractive index ne depending on the angle between the director 20 of the liquid crystal region 11 and the polarization direction of light impinging on the liquid crystal layer 1. Therefore, large part of light perpendicularly impinging on the liquid crystal layer 1 can be scattered (light-scattering state).

When light 24 incoming from the viewer's side (the front surface side of the front substrate 3) impinges on the liquid crystal layer 1 in this state, the light 24 is mainly scattered by the interface between the liquid crystal regions and the walls 10 to outgo toward the viewer's side, resulting in a white display state. Note that the light 24 is scattered not only by the above interface but also by fluctuation of the alignment of the liquid crystal molecules in the liquid crystal regions 11. Although the light 24 shown in the drawing is scattered backward by the liquid crystal layer 1, the light 24 may sometimes be scattered forward by the liquid crystal layer 1, then reflected by the retroreflective layer 16, and again scattered forward before being outgoing toward the viewer's side.

On the other hand, as shown in FIG. 2(b), when a voltage which is equal to or greater than a predetermined value is applied across the liquid crystal layer 1, the directors 20 of the liquid crystal regions 11 are oriented perpendicular to the substrates 2, 3. Here, for the light incoming through the front substrate 3, the refractive index of the liquid crystal regions 11 is generally equal to the ordinary refractive index no of the liquid crystal material. The present embodiment is designed such that the ordinary refractive index no of the liquid crystal material and the refractive index np of the polymer that forms the walls 10 are approximately equal to each other (no≈np). Thus, the liquid crystal layer 1 is in a light-transmitting state.

When light 26 incoming from the viewer's side impinges on the liquid crystal layer 1 which is in a light-transmitting state, the light 26 is transmitted through the liquid crystal layer 1 and then reflected by the retroreflective layer 16 to travel back to where the light 26 came from, resulting in a black display state.

Note that, although the liquid crystal regions 11 shown in the drawing has a bipolar alignment with the two poles, the alignment of the liquid crystal molecules in the liquid crystal regions 11 in the present embodiment is not limited to a bipolar alignment but may be such an alignment that they have directors in a plane.

Next, the alignment of the liquid crystal molecules in the liquid crystal layer in the present embodiment is described while comparing with the alignment of the liquid crystal molecules in the conventional example.

Figure 2:
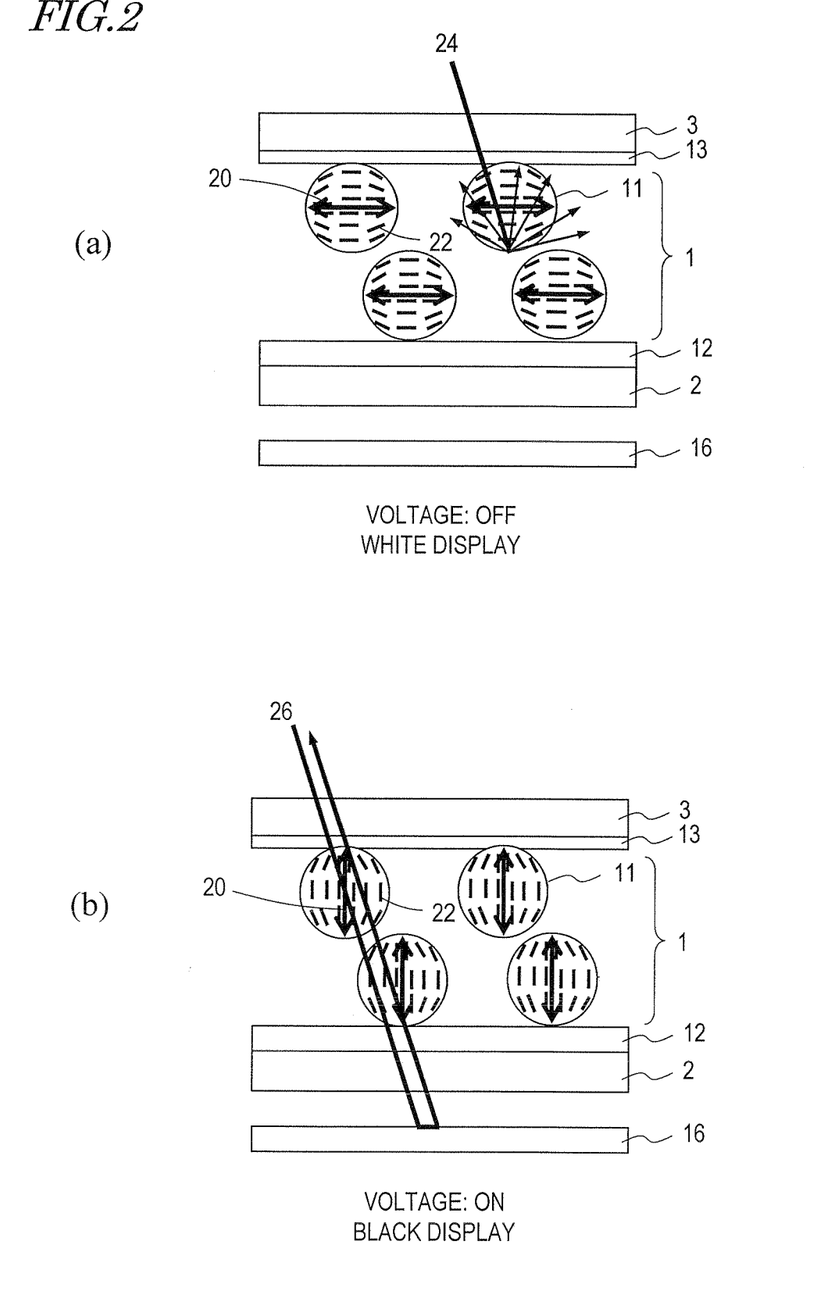
Figure 3:
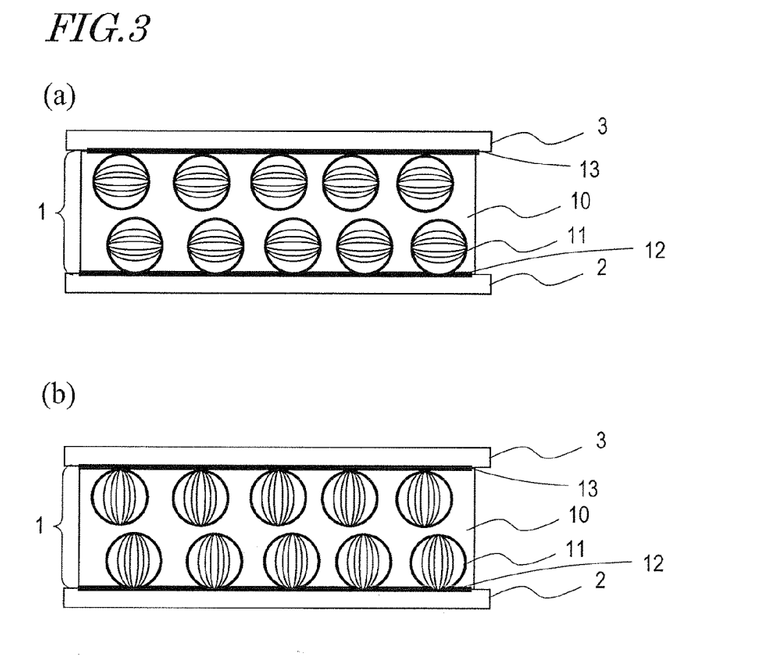
Figure 4:
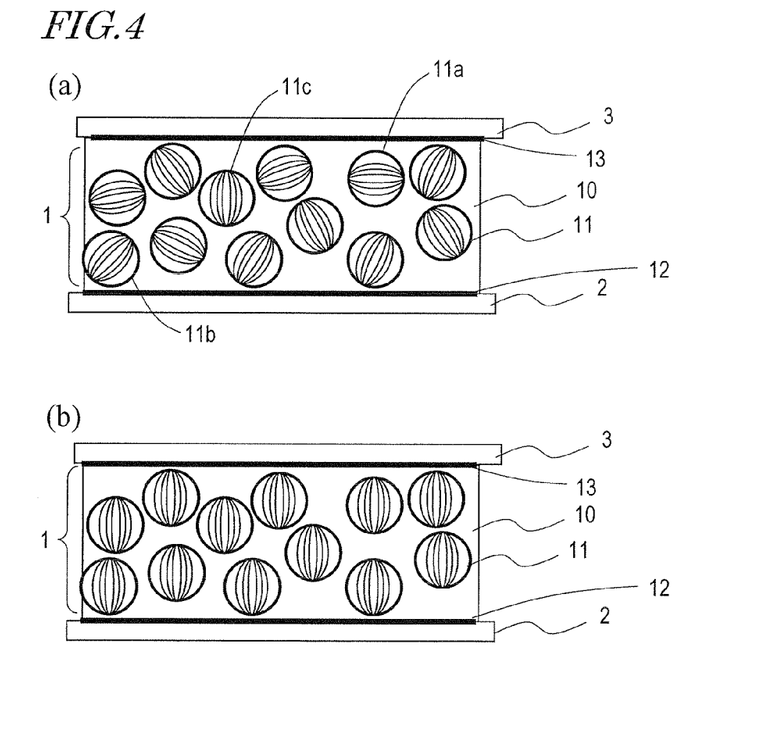

FIGS. 3(a) and 3(b) are schematic cross-sectional views of the liquid crystal layer of the present embodiment, illustrating alignments of the liquid crystal molecules in the liquid crystal layer in the absence and presence of an applied voltage, respectively. FIGS. 4(a) and 4(b) are schematic cross-sectional views of a conventional liquid crystal layer (for example, a liquid crystal layer disclosed in Patent Document 1), illustrating alignments of the liquid crystal molecules in the liquid crystal layer in the absence and presence of an applied voltage, respectively. For the sake of simplicity, elements similar to those of FIG. 1 and FIG. 2 are denoted by the same reference numerals, and the description thereof is herein omitted.

As shown in FIG. 3(a), in the liquid crystal layer 1 of the present embodiment, the respective liquid crystal regions 11 in the absence of an applied voltage are regulated by the alignment films 12, 13 so as to have directors in a plane. Therefore, the liquid crystal regions 11 and the walls 10 have a large difference in refractive index. Accordingly, the liquid crystal layer 1 has a high scattering intensity so that a bright white display state can be obtained. Also, in the present embodiment, the alignment films 12, 13 are not provided with an alignment treatment, such as a rubbing treatment, and therefore, the directors of the respective liquid crystal regions 11 are oriented in random directions in a plane (see FIG. 1(b)). Thus, the azimuthal dependence of the scattering characteristic can be decreased, and the viewing angle characteristics can be improved.

On the other hand, in the conventional liquid crystal layer 1, the liquid crystal regions 11 are generally surrounded by the walls 10 so as not to be in direct contact with the alignment films 12, 13 as shown in FIG. 4(a). Therefore, the directors of the liquid crystal regions 11 are not regulated by the alignment films 12, 13 so that they are oriented in random directions. The director of each of the liquid crystal regions 11 mainly depends on the shape of the small section 14. Some of the liquid crystal regions 11, for example, the liquid crystal region 11a, have directors which are generally parallel to the substrates 2, 3 and can have high scattering characteristic. However, other liquid crystal regions 11, for example, the liquid crystal region 11b, have directors which are inclined relative to the normal to the substrates 2, 3, and therefore, the difference in refractive index between the liquid crystal region 11b and the wall 10 is smaller than the difference in refractive index between the liquid crystal region 11a and the wall 10. Therefore, the liquid crystal region 11b has poorer light-scattering characteristic than the liquid crystal region 11a, although it is capable of scattering light. The liquid crystal region 11c has a director which is generally perpendicular to the substrates 2, 3 and fails to contribute to scattering of light. Thus, in the conventional liquid crystal layer 1, the directors of the liquid crystal regions are not affected by the alignment films 12, 13 and are therefore oriented in random directions. There are many liquid crystal regions 11 which fail to contribute to scattering of light, such as the liquid crystal region 11c, and many liquid crystal regions 11 which have low scattering characteristic, such as the liquid crystal region 11b. Thus, the scattering intensity is much smaller than that of the liquid crystal layer 1 of the present embodiment.

On the other hand, as shown in FIG. 3(b) and FIG. 4(b), when a voltage is applied across the liquid crystal layer 1, the directors of the liquid crystal regions 11 are oriented in a direction normal to the substrates 2, 3 even in the liquid crystal layer 1 of the present embodiment as in the conventional liquid crystal layer 1. Therefore, if the liquid crystal material of the liquid crystal layer 1 and the polymer material of the walls 10 are the same, the transmittance of the liquid crystal layer in the presence of an applied voltage in the present embodiment would be generally equal to that achieved in the conventional example.

Thus, according to the present embodiment, a white display state which is brighter than in the conventional example can be realized while the brightness of a black display state is maintained at a level substantially equal to that of the conventional example, so that the display contrast can be improved. Alternatively, the thickness of the liquid crystal layer can be decreased while the brightness of a white display state is maintained. As a result, the liquid crystal layer can be driven at a lower voltage.

In the present embodiment, the alignment of the liquid crystal molecules in each of the liquid crystal regions 11 is uniform so that there is no disinclination inside the liquid crystal region 11. Therefore, the motion of the liquid crystal molecules is quick, and the speed of response which occurs when a voltage is applied thus can be improved, as compared with a case where liquid crystal droplets are used which have a radial alignment (disinclination is formed generally at the center of the liquid crystal droplet) such as described in Japanese Laid-Open Patent Publication No. 2002-303869.

Moreover, in the present embodiment, as will be described later, the surface energy of the alignment films 12, 13 is utilized to control the liquid crystal directors in the absence of an applied voltage. Therefore, application of pressure to the liquid crystal layer is not necessary in the present embodiment whereas it is required in the techniques disclosed in Patent Documents 2 to 4. Thus, the present embodiment is advantageous in terms of the manufacturing process and the manufacturing cost.

In the present embodiment, the director of the liquid crystal region 11 in each of the small sections 14 is affected by the regulation force of the alignment films 12, 13 and the structure (shape) of the small section 14. To configure the liquid crystal layer such that the directors of the respective liquid crystal regions 11 are oriented in random directions in a plane, it is preferred that the alignment films 12, 13 are not provided with an alignment treatment, such as a rubbing treatment. If the alignment films 12, 13 are not provided with a rubbing treatment, not all the plurality of liquid crystal regions 11 in a pixel are oriented in a specific direction (e.g., a rubbing direction), so that the alignment orientation is random. Thus, microscopically, each of the liquid crystal regions 11 has azimuthal dependence of the scattering characteristic which is attributed to the director. However, one pixel includes a plurality of liquid crystal regions 11 which have random directors. Thus, the azimuthal dependence of the scattering characteristic is averaged, and the viewing angle characteristics can be improved.

Figure 5:
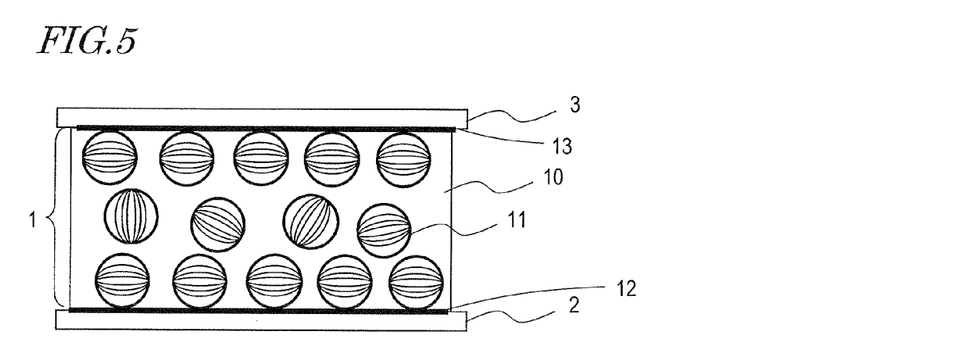
FIG. 5 A schematic cross-sectional view showing another example of the alignment of liquid crystal molecules in the display device of the present embodiment in the absence of an applied voltage.

In the present embodiment, one pixel may include a plurality of liquid crystal regions 11 which are affected by the alignment films 12, 13 to be randomly oriented in a plane. That is, some of the liquid crystal regions may have a radial alignment or may have disinclination inside the liquid crystal regions. Alternatively, for example, as shown in FIG. 5, liquid crystal regions 11 whose alignment are not affected by the alignment films 12, 13 may exist between a row of the liquid crystal regions 11 which are in contact with the alignment film 12 (upper layer) and a row of the liquid crystal regions 11 which are in contact with the alignment film 13 (lower layer). Even in this case, the scattering characteristic can be greatly improved as compared with the conventional liquid crystal layer 1 shown in FIG. 4(a).

To more surely regulate the alignment of the liquid crystal regions 11 by means of the alignment films 12, 13, it is preferable that at least two of the liquid crystal regions 11 formed in one pixel are in contact with one or both of the alignment films 12, 13. This more surely allows the directors of these liquid crystal regions 11 to be oriented in a direction generally parallel to the substrate. It is especially preferred that every one of the liquid crystal regions 11 in the liquid crystal layer 1 is in contact with either of the alignment films 12, 13. Note that, in this specification, the statement that "a liquid crystal region 11 is in contact with the alignment film 12, 13" includes a case where part of the liquid crystal molecules in the liquid crystal regions 11 are in direct contact with the alignment film 12, 13 as well as a case where the liquid crystal molecules of the liquid crystal regions 11 are affected by the alignment film 12, 13 even when a very thin film (e.g., nm or less) which contains liquid crystal molecules, polymers, etc., intervenes between the liquid crystal region 11 and the alignment film 12, 13.

The small sections 14 are preferably arranged in one or two layers with respect to the thickness direction of the liquid crystal layer 1. If the small sections 14 are arranged in three or more layers with respect to the thickness direction of the liquid crystal layer 1, the liquid crystal regions 11 located between the uppermost layer and the lowermost layer are not affected by the alignment films 12, 13 and are therefore not regarded as a mono-domain which has a director in a plane. If the liquid crystal layer 1 includes a large number of such liquid crystal regions 11, there is a probability that the scattering characteristic deteriorates. Also, a disinclination is more likely to occur in the liquid crystal regions 11, so that the motion of the liquid crystal molecules may become sluggish, resulting in a decreased response speed. On the other hand, if the small sections 14 are arranged in not more than two layers with respect to the thickness direction of the liquid crystal layer 1, almost all of the liquid crystal regions 11 in one pixel can be in contact with the alignment film 12, 13, so that the effect of improving the response speed, which is produced by the present invention, can be increased. Further, the liquid crystal layer 1 can be configured to have a small thickness, and hence, the driving voltage can be decreased.

The techniques disclosed in Patent Documents 2 to 4 only enable a structure where one small section is arranged with respect to the thickness direction of the liquid crystal layer (hereinafter, "one-layer structure"). On the other hand, the present embodiment enables a structure where the small sections 14 are arranged in two layers with respect to the thickness direction of the liquid crystal layer 1 (hereinafter, "two-layer structure"). In the liquid crystal layer 1 of the two-layer structure, the liquid crystal region 11 of the upper layer and the liquid crystal region 11 of the lower layer (two liquid crystal regions 11 adjoining along the thickness direction of the liquid crystal layer 1) have different director azimuths, and therefore, light perpendicularly impinging on the liquid crystal layer 1 can be assuredly scattered by any of the liquid crystal regions 11. Thus, the scattering intensity is higher than that of the liquid crystal layer 1 of the one-layer structure.

Even in the case of the liquid crystal layer 1 of the one-layer structure, light impinging on the liquid crystal layer 1 can be scattered not only by the interface between the liquid crystal regions 11 and the walls 10 but also by fluctuation of the liquid crystal molecules of the liquid crystal regions 11, so that a sufficient scattering intensity can be obtained.

In the present specification, the statement that the small sections 14 are arranged in one layer with respect to the thickness direction of the liquid crystal layer 1 (one-layer structure) means that another small section does not intervene between each of the plurality of small sections 14 and the alignment film 12, 13. The statement that the small sections 14 are arranged in two layers with respect to the thickness direction of the liquid crystal layer 1 (two-layer structure) means that another small section does not intervene between each of the plurality of small sections 14 and one of the alignment films 12, 13 which is closer to the small section 14.

As will be described later, to form the small sections 14 such that the liquid crystal regions 11 are in contact with the alignment films 12, 13, it is preferable that the surface free energy of the alignment films 12, 13 is optimized. The present inventors reached this knowledge after conducting various examinations. The suitable range of the surface free energy is, for example, not less than 44 mJ/m$^2$ and not more than 50 mJ/m$^2$, although it depends on the material of the liquid crystal layer 1.

In the present embodiment, the density of the small sections 14 (i.e., the density of liquid crystal regions 11) included in one pixel is preferably 0.016 sections/μm$^2$ or higher and, more preferably, 1 section/μm$^2$ or higher. This is because the scattering intensity of the liquid crystal layer 1 increases as the density of the small sections 14 increases, so that a brighter white display state can be achieved. On the other hand, if one pixel includes too many small sections 14, the size of each small section 14 decreases, so that liquid crystal regions 11 which are not in contact with the alignment film 12, 13 are more likely to occur. Also, it is probable that the motion of the liquid crystal molecules 22 becomes sluggish due to the interaction between the walls 10 of the small sections 14 and the liquid crystal molecules 22, so that the response speed decreases. Note that, when the liquid crystal layer 1 has a two-layer structure, the density of the small sections 14 in each of the two layers is preferably 0.016 sections/μm$^2$ or higher. In this case, the density of the small sections 14 in each of the pixels of the liquid crystal layer 1 is 0.032 sections/μm$^2$ or higher.

The average of length H of the small sections 14 along the thickness direction of the liquid crystal layer 1 (hereinafter, simply "average height $H_{AVE}$") is preferably ⅓ or more of the thickness of the liquid crystal layer 1. More preferably, it is ½ or more of the thickness of the liquid crystal layer 1. If average height $H_{AVE}$ of the small sections 14 is smaller than ½ of the liquid crystal layer 1, liquid crystal regions 11 which are free of the effects of the alignment films 12, 13 are likely to occur in part of the liquid crystal layer 1 at the center of its thickness. In such liquid crystal regions 11, the liquid crystal molecules 22 are oriented along the thickness direction of the liquid crystal layer 1, so that the director 20 does not exist in its plane. As a result, it becomes difficult to control the alignment of the liquid crystal molecules 22 in the absence of an applied voltage.

On the other hand, it is preferred that the average of maximum width W of the small sections 14 in a plane of the liquid crystal layer 1 (hereinafter, simply "average width $W_{AVE}$") is generally equal to average height $H_{AVE}$.

Preferably, average height $H_{AVE}$ of the small sections 14 is appropriately selected within the range of, for example, not less than 0.6 µm and not more than 6 µm, while average width $W_{AVE}$ is appropriately selected within the range of, for example, not less than 0.6 µm and not more than 6 µm. The reasons for these conditions are described below.

If the small sections 14 are excessively large, the number of small sections 14 per unit area in the display region (e.g., in one pixel) would decrease. Accordingly, the density of the small sections 14 (i.e., the density of the liquid crystal regions 11 per unit area in the display region) would decrease so that high scattering characteristic cannot be obtained. Also, discontinuous alignment of the liquid crystal molecules 22, i.e., disinclination, would more readily occur in the liquid crystal region 11 in each of the small sections 14. The motion of the liquid crystal molecules 22 would become sluggish near the disinclination of the liquid crystal region 11, and therefore, there is a probability that the response speed decreases. Thus, when the average diameter of the small sections 14 is not less than 0.6 µm and not more than 6 µm, occurrence of a disinclination in the liquid crystal region 11 can effectively be prevented while securing the density of the liquid crystal regions 11.

On the other hand, if average height $H_{AVE}$ or average width $W_{AVE}$ of the small sections 14 is less than 0.6 µm, the effects of the interaction between the walls 10 of the small sections 14 and the liquid crystal molecules 22 of the liquid crystal regions 11 would significantly increase so that the motion of the liquid crystal molecules 22 would become sluggish. Also, the number of liquid crystal regions 11 which are not in contact with the alignment film 12, 13 is likely to increase, so that there is a probability that the scattering characteristic and the response speed cannot be sufficiently improved. Therefore, both average height $H_{AVE}$ and average width $W_{AVE}$ of the small sections 14 are preferably 0.6 µm or more.

The thickness of the liquid crystal layer 1 is not limited to any particular value but may be appropriately selected according to, for example, the reflectance of the retroreflective layer 16, the driving voltage, etc. For example, when the driving voltage is 4 V to 5 V, the liquid crystal layer 1 is designed to have a thickness of about 4 µm.

The material of the liquid crystal layer 1 is not limited to any particular one, but the dielectric constant anisotropy of the liquid crystal material of the liquid crystal layer 1 is preferably positive. Although the liquid crystal molecules are expected to incline so as to be in parallel with the substrate when the voltage is on, the direction of the inclination cannot be controlled if the dielectric anisotropy of the liquid crystal material is negative, so that the molecules in the liquid crystal droplets readily deviate from a homogeneous alignment. As a result, there is a probability that a disinclination occurs in the liquid crystal region, or the motion of the liquid crystal molecules is impeded. To utilize the display principles which have been previously described with reference to FIG. 2, the liquid crystal layer preferably does not contain a chiral agent. Further, the birefringence value Δn of the liquid crystal material of the liquid crystal layer (the difference between extraordinary refractive index ne and the ordinary refractive index no) is preferably not less than 0.1 and not more than 0.3. When the birefringence value Δn is 0.1 or greater, the display contrast can be increased. On the other hand, when the birefringence value Δn is 0.3 or smaller, there is a wide choice of materials, and a lower voltage and a higher response speed can be achieved.

The liquid crystal layer 1 of the present embodiment may be formed by preparing a mixture of a nematic liquid crystal material (i.e., low molecular weight liquid crystal composition) and a photocurable resin (monomer and/or oligomer) such that they are compatible with each other, providing the mixture between transparent substrates, and then polymerizing the photocurable resin. Although the type of the photocurable resin is not limited to any particular one, a UV-curable resin is preferably used. When the UV-curable resin is used, the above mixture need not to be heated during the polymerization, and therefore, adverse effects of the heat on other elements can be prevented. The monomer and oligomer may be monofunctional or polyfunctional.

In the present embodiment, the liquid crystal layer 1 is formed by photocuring a mixture of a UV-curable resin and a liquid crystal composition which exhibits liquid crystal properties (liquid crystal mixture) by irradiation with active energy rays, such as ultraviolet rays. The liquid crystal mixture may be, for example, a liquid crystal mixture that exhibits a nematic liquid crystal phase at normal temperature, which may be prepared by mixing a UV-curable material and a liquid crystal in the proportion by weight of 20:80 and adding a small amount of photoinitiator to the mixture.

The above liquid crystal mixture is provided between a pair of substrates by, for example, a vacuum injection method or a One Drop Fill (ODF) method and then irradiate with ultraviolet. As a result of this, the UV-curable prepolymer is polymerized to become a polymer which is phase-separated from the liquid crystal, whereby a liquid crystal layer is formed which includes walls of the polymer and a plurality of liquid crystal regions separated by the walls.

Figure 1:
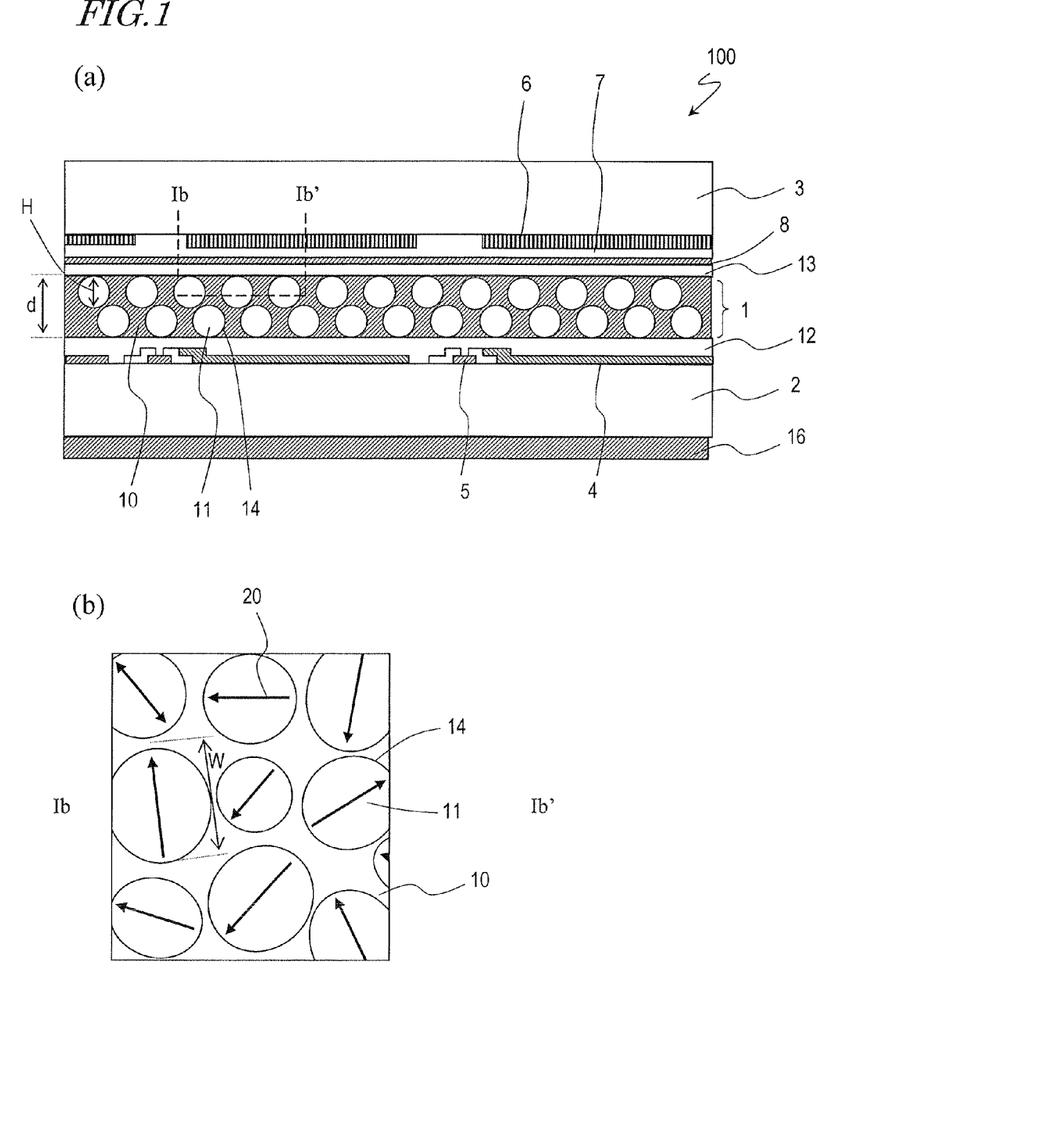

The structure of the liquid crystal display device of the present embodiment is not limited to that of the liquid crystal display device 100 shown in FIG. 1. For example, the retroreflective layer 16 may be replaced by a reflective layer which provides a good contrast with the color of white or may be replaced by a light-absorbing layer. Alternatively, a reflective layer, such as a retroreflective layer, may be provided between the rear substrate 2 and the alignment film 12. In this case, the reflective layer may be separated into portions corresponding to respective ones of the pixels such that they function as pixel electrodes.

When the reflective layer used has a flat surface, the reflective layer is preferably provided between the rear substrate 2 and the alignment film 12. When the reflective layer used has an uneven surface such as a corner cube array, the reflective layer is preferably provided on the rear side of the rear substrate 2. Note that the reflective layer which has an uneven surface may be provided between the rear substrate 2 and the alignment film 12. In this case, it is necessary to provide a planarization layer between the reflective layer and the alignment film 12. This is because the liquid crystal molecules are oriented parallel to the surface of the alignment film 12, and hence, if the alignment film 12 has an uneven surface, there is a probability that it becomes difficult to control the directors 20 of the liquid crystal regions 11 to be in a plane.

<Manufacturing Method of Liquid Crystal Display Device>

The liquid crystal display device of the present embodiment may be manufactured by, for example, a method described below. In an example described herein, the liquid crystal layer is formed using a vacuum injection method.

First, surfaces of a glass substrate on which thin film transistors and pixel electrodes are formed (rear substrate) and a glass substrate on which color filters and a counter electrode are formed (front substrate) are coated using a spin coat method or an inkjet method to uniformly form alignment films, which are then baked at a predetermine temperature. The alignment films are not provided with a rubbing treatment. The alignment films used herein are horizontal alignment films with the surface free energy of 47 mJ/m$^2$, which was measured by a method that will be described later.

Then, a photocurable monomer, a photoinitiator, a positive-type liquid crystal are uniformly mixed to prepare a liquid crystal mixture. The temperature during mixing is not less than temperature $T_{ni}$ at which the liquid crystal mixture transitions to a nematic phase. The liquid crystal constitutes 80 to 85% of the composition. The resultant mixture is maintained at a temperature not less than transition temperature $T_{ni}$.

Then, the front substrate and the rear substrate are placed so as to oppose each other such that the alignment films are placed inside, and attached to each other via a spacer for securing a predetermined gap therebetween.

While these substrates are maintained at a temperature not less than transition temperature $T_{ni}$, a liquid crystal mixture maintained at a temperature not less than transition temperature $T_{ni}$ is injected into the gap between the substrates (vacuum injection method). Thereafter, the mixture is irradiated with light (ultraviolet) at a temperature not less than transition temperature $T_{ni}$ such that a polymer is produced from monomers contained in the mixture and that the polymer and the liquid crystal are phase-separated. As a result, the liquid crystal layer is formed between the front substrate and the rear substrate. In this way, the liquid crystal display device is obtained.

In the above-described method, the vacuum injection method is used in the formation of the liquid crystal layer. However, an ODF method may be used instead. A method for forming the liquid crystal layer in such a case is described below.

First, formation of alignment films and preparation of a liquid crystal mixture are performed in the same way as in the case of using the vacuum injection method.

Then, the liquid crystal mixture of a predetermined amount, which is maintained at a temperature not less than transition temperature $T_{ni}$, is dropped on the alignment film of the rear substrate or the front substrate maintained at a temperature not less than transition temperature $T_{ni}$. Thereafter, the other substrate is attached to the substrate on which the mixture has been dropped such that they oppose each other via a spacer.

Then, the liquid crystal mixture between the substrate is irradiated with light (ultraviolet) at a temperature not less than transition temperature $T_{ni}$, such that a polymer is produced from monomers contained in the mixture and that the polymer and the liquid crystal are phase-separated. In this way, the liquid crystal layer is obtained.

Thereafter, a retroreflective plate, such as a corner cube array, is provided on the rear side of the rear substrate. In this way, the display device of the present embodiment is obtained.

In the case where the liquid crystal display device is manufactured using the above-described method, the configuration of the liquid crystal layer, such as the size, shape, arrangement, etc., of the liquid crystal regions, can be controlled by the type of alignment films and the formation conditions for the liquid crystal layer, etc. As will be described below in detail, the size of the liquid crystal regions can be adjusted by changing the irradiation conditions for the liquid crystal mixture. The arrangement of the liquid crystal regions in the liquid crystal layer can be adjusted by changing the type of the alignment films.

<Relationship Between Size of Liquid Crystal Regions and Irradiation Conditions for Liquid Crystal Mixture>

In the present embodiment, to improve the scattering characteristic of the liquid crystal layer, the size of the small sections (i.e., the size of the liquid crystal regions) is preferably controlled to be within a predetermined range. In the case where a liquid crystal mixture which is similar to that employed in the above-described method is used to form the liquid crystal layer, the size of the liquid crystal regions can be adjusted by changing the irradiation conditions for the liquid crystal mixture. The present inventors examined the relationship between the irradiation conditions and the size of the liquid crystal regions. The procedure and results of the examination are described below.

First, an ITO film and an alignment film are formed in this order on the surfaces of two glass substrates, and then, a liquid crystal mixture is injected between these glass substrates using a vacuum injection method. The method for forming the alignment films and the materials and mixing ratio of the liquid crystal mixture are the same as those described above. Then, the liquid crystal mixture injected between these glass substrates is irradiated so as to be polymerized and phase-separated, whereby the liquid crystal layer is formed. The irradiation intensity is selected within the range of 2 mW/cm$^2$ to 140 mW/cm$^2$. In this way, a plurality of liquid crystal cells with different irradiation intensities (hereinafter, "sample liquid crystal cells") are fabricated.

The light used for irradiation in the fabrication of the sample liquid crystal cells may be light transmitted through a filter that is configured to remove the wavelengths of 340 nm or less, for example. Irradiation with light at 340 nm or less may cause a problem such as decomposition of the liquid crystal contained in the liquid crystal mixture.

The duration of the irradiation is a sufficient period of time for monomers contained in the liquid crystal mixture to be polymerized. Here, the duration of the irradiation may be set such that $T_{ni}$ of the liquid crystal material of the liquid crystal regions is about 99% or more of $T_{ni}'$ of the liquid crystal which is contained in the liquid crystal mixture as a source material. For example, for the irradiation intensity of 50 mW/cm$^2$, the irradiation duration is 50 sec.

Thereafter, the size of the small sections in the respective sample liquid crystal cells is obtained by SEM observation. Specifically, the sample liquid crystal cells are dissected, and the liquid crystal in the small sections is washed away with an organic solvent. Then, the front substrate is peeled away from the resultant sample liquid crystal cells, and a thin conductive film is formed by sputtering. Thereafter, the small sections in the liquid crystal layer are observed from the above. Here, for a plurality of (e.g., 100) small sections included in one pixel, the maximum width of each small section is measured, and the average of the maximum widths (average width), $W_{AVE}$, is calculated.

The results of the SEM observation were compared with results of microscopic observation of the respective sample liquid crystal cells before the dissection with the use of an optical microscope. It was confirmed by the comparison that the SEM-observed shape and arrangement of the small sections were identical to the shape and arrangement of the liquid crystal regions in the respective sample liquid crystal cells before the dissection. Thus, it is inferred that average width $W_{AVE}$ of the small sections which was obtained by SEM observation is equal to the average width of the liquid crystal regions formed in the small sections.

The relationship between average width $W_{AVE}$ of the small sections (i.e., the average width of the liquid crystal regions) which was obtained by SEM observation and the intensity of light for irradiation of the liquid crystal mixture is shown in TABLE 1. As seen from the results shown in TABLE 1, the size of the liquid crystal regions increases as the irradiation intensity decreases, and the size of the liquid crystal regions decreases as the irradiation intensity increases. Hence, it was confirmed that the size of the liquid crystal regions can be controlled by the irradiation intensity. It was found that, to control the average width of the liquid crystal regions so as to be generally 2 μm or less, the irradiation intensity may be 50 mW/cm² or more. Note that the numeric range of the irradiation intensity depends on the materials and mixing ratio of the liquid crystal mixture used.

Although in the example described herein we calculated the average width of the liquid crystal regions, the average height of the liquid crystal regions can also be controlled by the irradiation conditions, as the average width of the liquid crystal regions can be, so long as it is not more than the thickness of the liquid crystal layer (e.g., 4 μm). Note that, if the liquid crystal regions are large so that each extends across the entire thickness of the liquid crystal layer (one-layer structure), the average height of the liquid crystal regions depends on the thickness of the liquid crystal layer and is therefore constant irrespective of the irradiation conditions.

TABLE 1

| Irradiation Intensity (mW/cm²) | 2 | 20 | 50 |
|---|---|---|---|
| Average Width of Small sections or LC Regions (μm) | 50 | 10 | 2 |

<Relationship Between Arrangement of Liquid Crystal Regions and Surface Free Energy of Alignment Films>

To more surely control the liquid crystal alignment of the liquid crystal regions 11, the small sections 14 are preferably arranged in not more than two layers with respect to the thickness direction of the liquid crystal layer 1, so that the alignment of the liquid crystal regions 11 can be regulated by the alignment films 12, 13 in almost all of the small sections 14. The present inventors conducted various examinations as to the fabrication conditions of the liquid crystal cells for controlling the arrangement of the liquid crystal regions 11 and obtained the knowledge that it is important to control the characteristics (surface free energy) of the alignment films 12, 13. Hereinafter, the procedure for examining the fabrication conditions of the liquid crystal cells and the results of the examinations are described below in detail.

Here, four types of horizontal alignment films (hereinafter, simply "alignment film") A to D which have different surface free energies are used. Alignment film A (trade name AL1T1048 manufactured by JSR Corporation) is an alignment film commonly used among TFT-based liquid crystal display devices. Alignment film A has a higher voltage holding ratio than alignment film B. Alignment film B (trade name Plx1400 manufactured by Hitachi Chemical DuPont Micro-Systems, Ltd.) is a horizontal alignment film used in a commercially-available horizontal alignment standard cell. Alignment film C (trade name AL1L509 manufactured by JSR Corporation) and alignment film D are alignment films which are commonly used in liquid crystal display devices of STN (Super Twisted Nematic) mode and IPS (In-Plane-Switching) mode, respectively.

First, the surface free energy of the four types of alignment films is measured. In the measurement, the average contact angle of a probe solution is measured by a sessile drop method using a solid-liquid interface analyzer (DropMaster-500) manufactured by Kyowa Interface Science Co., Ltd. As the probe solution, water, ethylene glycol, and diiodomethane are used. The surface free energies of these probe solutions are, respectively, 72.8 mJ/m², 47.7 mJ/m², and 50.8 mJ/m². Specifically, the above probe solutions are dispensed in the form of a drop of about 30 μl on the surfaces of the respective alignment films for measuring the contact angle. The average of 10 measurements of the contact angle is calculated to obtain the "average contact angle" for each of the probe solutions. Thereafter, the surface free energies of the alignment films are obtained by an analysis based on the Kitazaki-Hata method using a FAMAS surface free energy analysis add-in software which is an accompaniment of the measurement apparatus.

On alignment film B, the obtained contact angles of the drops of water, ethylene glycol, and diiodomethane were 76.6°, 45.5°, and 26.6°, respectively. An analysis with the obtained contact angles showed that the surface free energy of this alignment film is 47±2.2 mJ/m². The surface free energies of alignment films A, C, and D obtained by the same analysis were 41 mJ/m², 54 mJ/m², and 65 mJ/m², respectively.

Then, above-described alignment films A to D are used to fabricate sample liquid crystal cells. Here, alignment films are formed on the surfaces of two glass substrates, and a liquid crystal mixture is injected between these glass substrates using a vacuum injection method. The formation method of the alignment films and the materials and mixing ratio of the liquid crystal mixture are the same as those described above. Thereafter, the liquid crystal mixture between the glass substrates is irradiated with light (ultraviolet) at the intensity of 50 mW/cm² so as to be polymerized and phase-separated, whereby the liquid crystal layer is formed. In this way, the sample liquid crystal cells No. 1 to No. 4 which include alignment films A to D are fabricated.

Resultant sample liquid crystal cells No. 1 to No. 4 are dissected, and the liquid crystal in the small sections is washed away with an organic solvent. Then, over a cross-section to be observed, a thin conductive film is deposited by sputtering, and cross-sectional SEM observation is performed. Further, one of the glass substrates of the sample liquid crystal cells is peeled away, and planar SEM observation from the above of the liquid crystal layer is performed. The cross-sectional and planar SEM observations enable observation of the arrangement of the small sections defined by the polymer walls.

The results of the planar SEM observation were first compared with results of microscopic observation of the respective sample liquid crystal cells before the dissection with the use of an optical microscope. It was confirmed by the comparison that the shape and arrangement of the small sections which were detected by the planar SEM observation were identical to those of the liquid crystal regions in the respective sample liquid crystal cells before the dissection. Thus, it is inferred that the arrangement of the small sections along the thickness direction of the liquid crystal layer which was detected by cross-sectional SEM observation is identical to the arrangement of the liquid crystal regions along the thickness direction of the liquid crystal layer.

Figure 6:
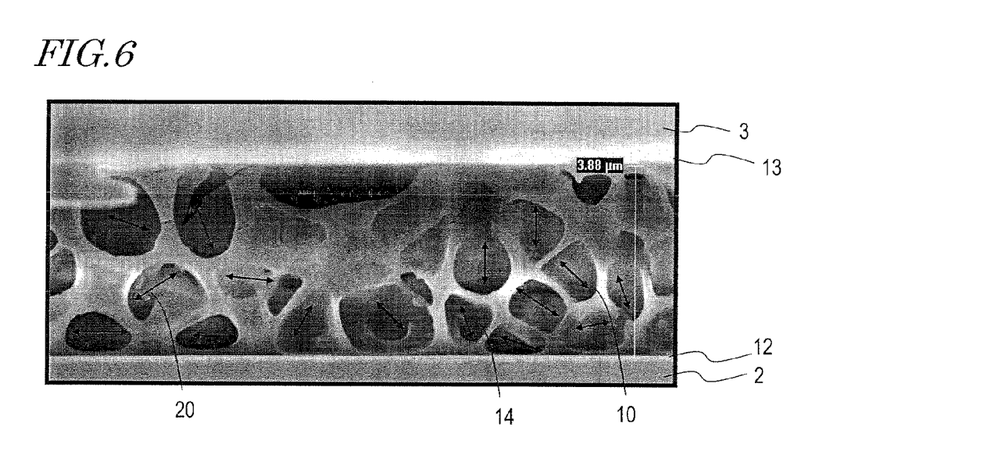
FIG. 6 A cross-sectional SEM image of the liquid crystal layer of the sample liquid crystal cell No. 1 including alignment film A.
Figure 7:
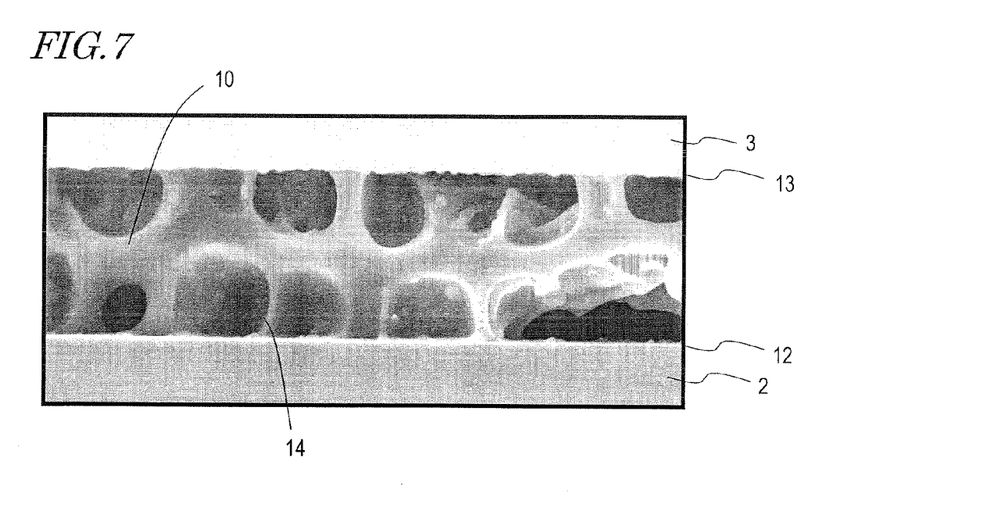
FIG. 7 A cross-sectional SEM image of the liquid crystal layer of the sample liquid crystal cell No. 2 including alignment film B.

The results of cross-sectional SEM observation of the small sections are now described. FIGS. 6 and 7 show cross-sectional SEM images of the sample liquid crystal cells No. 1 and No. 2 which include alignment films A and B, respectively.

In the sample liquid crystal cells No. 1 and No. 2, the liquid crystal layer is interposed between the glass substrates 2, 3. The liquid crystal layer includes the plurality of small sections 14 defined by the polymer walls 10.

In the sample liquid crystal cell No. 1, as seen from FIG. 6, it was detected that part of the liquid crystal layer 1 included three or more small sections 14 arranged along the thickness direction of the liquid crystal layer 1. Thus, there were small sections 14 at the center of the thickness of the liquid crystal layer 1 which were not in contact with any of the alignment films 12, 13. In the liquid crystal regions formed in these central small sections 14, there is a high probability that the liquid crystal molecules are scarcely regulated by the alignment films 12, 13 so that they are oriented generally vertically. It was also detected that every one of the small sections 14 in the liquid crystal layer 1 was surrounded by the walls 10. Even the liquid crystal regions 11 located in the vicinity of the alignment films 12, 13 are not in direct contact with the alignment films 12, 13 and are unlikely to be regulated by the alignment films 12, 13.

Also in the liquid crystal layers of the sample liquid crystal cells No. 3 and No. 4, it was detected that there were three or more small sections arranged along the thickness direction of the liquid crystal layer as in the sample liquid crystal cell No. 1, and there were small sections at the center of the liquid crystal layer 1 which were not in contact with an alignment film.

In the sample liquid crystal cell No. 2, as seen from FIG. 7, the small sections 14 formed by the polymer walls 10 were arranged in two layers with respect to the thickness direction of the liquid crystal layer 1. The small sections 14 of the lower layer were in contact with the alignment film 12. The small sections 14 of the upper layer were in contact with the alignment film 13. Therefore, a small section 14 which was not in contact with any of the alignment films 12, 13 was not detected. It is inferred from this that a liquid crystal region in which liquid crystal molecules are not regulated by the alignment films 12, 13 to be vertically oriented is scarcely formed. It was confirmed that the sample liquid crystal cell No. 2 achieves higher scattering characteristic than the other sample liquid crystal cells No. 1, No. 3, and No. 4.

Thus, it was confirmed that the liquid crystal molecules in the liquid crystal region formed in each of the small sections 14 are regulated by the alignment films 12, 13 more assuredly to be oriented in parallel with the substrate, so that the scattering characteristic can be effectively improved. It was also confirmed that the polymer walls 10 formed are generally perpendicular to the substrate.

The results of measurement of the surface free energy of alignment films A to D and the arrangement of small sections in the sample liquid crystal cells No. 1 to No. 4 are shown in TABLE 2.

TABLE 2

|  | Sample LC Cell | | | |
| --- | --- | --- | --- | --- |
|  | No. 1 | No. 2 | No. 3 | No. 4 |
| Alignment Film | A | B | C | D |
| Alignment Film Surface Free Energy (mJ/m$^2$) | 41 | 47 | 54 | 65 |
| Arrangement of Small sections (LC Regions) Along Thickness of LC Layer | 3 or more layers: LC regions at LC layer center are not in contact with alignment film. | 2 layers: Almost all LC regions are in contact with alignment film. | 3 or more layers: LC regions at LC layer center are not in contact with alignment film. | 3 or more layers: LC regions at LC layer center are not in contact with alignment film. |

From the results shown in TABLE 2, it was found that setting the surface free energy of the alignment film to, for example, not less than 44 mJ/m$^2$ and not more than 50 mJ/m$^2$ (analyzed by the Kitazaki-Hata method) more reliably ensures that the liquid crystal regions are arranged in not more than two layers. This can reduce the proportion of liquid crystal regions located at the center of the liquid crystal layer which are not regulated by any of the alignment films relative to all the liquid crystal regions located throughout the liquid crystal layer. Therefore, the scattering efficiency of the liquid crystal layer can be increased.

For the sample liquid crystal cells No. 1 and No. 2, we peeled away one of the glass substrates and conducted a planar SEM observation from the above of the liquid crystal layer. In the sample liquid crystal cell No. 1, many polymer aggregation regions were detected. In the sample liquid crystal cell No. 2, the polymer and the liquid crystal regions were detected to be generally uniformly separated. Thus, it was found that, in the sample liquid crystal cell No. 2, uneven display which would occur due to polymer aggregations is prevented, so that higher display characteristics can be obtained. Further, it was also found from the result of the planar SEM observation of the sample liquid crystal cell No. 2 that the polymer walls are continuous and the thickness of the walls is generally uniform.

<Evaluation of Scattering Characteristic of Liquid Crystal Layer>

Alignment films A and B specified in Table 2 above were used to fabricate liquid crystal cells for evaluation of the scattering characteristic (sample liquid crystal cell No. 5 and sample liquid crystal cell No. 6), and the scattering characteristic of these samples was measured. The evaluation method used and the results of the evaluation are described below.

First, on one of the surfaces of a glass substrate, a transparent electrode and alignment film A were formed in this order to obtain a front substrate. A rear substrate was fabricated likewise. Then, the front and rear substrates were arranged so as to oppose alignment film A, and plastic beads having a diameter of 4 μm were dispersed therebetween. Thereafter, these substrates were bound together, and a liquid crystal mixture was injected using a vacuum injection method. The materials and mixing ratio of the liquid crystal mixture were the same as those used in fabrication of the above-described sample liquid crystal cells No. 1 to No. 4. Then, the liquid crystal mixture between the substrates was irradiated with light (ultraviolet) at the intensity of 50 mW/cm$^2$ so as to be polymerized and phase-separated, whereby a liquid crystal layer (thickness: 4 μm) was formed between the substrates. A liquid crystal cell obtained in this way is referred to as sample liquid crystal cell No. 5.

The sample liquid crystal cell No. 6 was also fabricated using the same method as the sample liquid crystal cell No. 5 except that alignment film B was used in place of alignment film A.

The sample liquid crystal cells No. 5 and No. 6 which were fabricated using the above-described method were supplied with light such that the light comes in at the front substrate side. The distribution of the scattering angles of light which was scattered by the liquid crystal layer to outgo at the front substrate side (scattered light) was measured. In the measurement, an LCD evaluation apparatus manufactured by Otsuka Electronics Co., Ltd. (LCD5200) was used.

Figure 8:
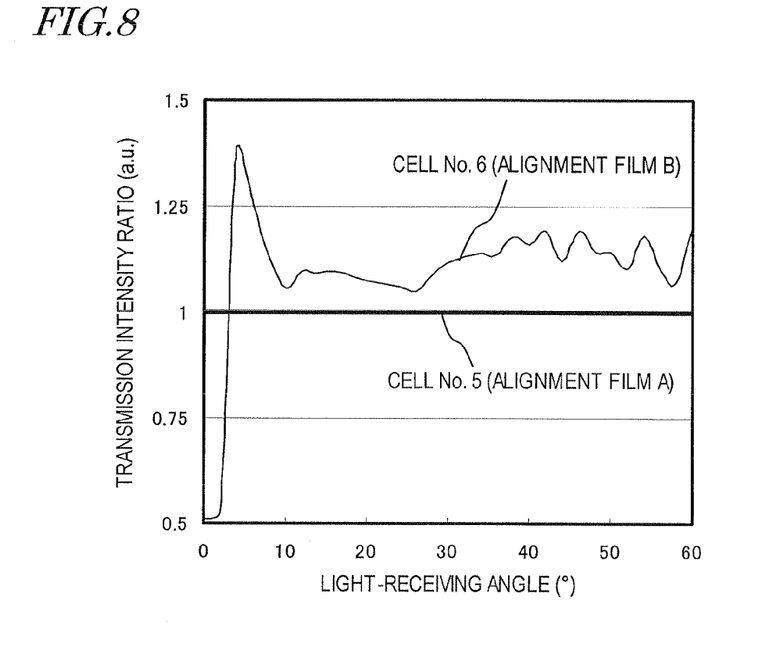
FIG. 8 A graph showing the result of measurement of the scattering characteristic of the sample liquid crystal cell No. 5 including alignment film A and the sample liquid crystal cell No. 6 including alignment film B in the absence of an applied voltage (white display state).

The measurement results are shown in FIG. 8. In the graph shown in FIG. 8, the abscissa axis represents the light-receiving angle of light scattered by the liquid crystal layer of each cell, which is specifically expressed by the absolute value of an angle between the light-receiving direction and a direction normal to the substrate. The ordinate axis represents the intensity ratio of light scattered by the liquid crystal layer of each cell (transmission intensity ratio). The transmission intensity ratio is normalized with the value of the scattered light intensity of the sample liquid crystal cell No. 5 (including alignment film A) for respective light-receiving angles.

As apparent from the results shown in FIG. 8, at light-receiving angles equal to or greater than 5°, the scattered light intensity of the sample liquid crystal cell No. 6 was greater than that of the sample liquid crystal cell No. 5. Therefore, it is appreciated that the sample liquid crystal cell No. 6 exhibits a better scattering characteristic, and realizes a brighter white display state, than the sample liquid crystal cell No. 5 even though the same materials, thickness, and exposure illuminance of the liquid crystal layer are employed in these sample liquid crystal cells. This is probably because, in the liquid crystal layer of the sample liquid crystal cell No. 6, almost all the liquid crystal regions are arranged so as to be in contact with alignment film A (see FIG. 7) so that they have directors in a plane, whereas the liquid crystal layer of the sample liquid crystal cell No. 5 includes liquid crystal regions which fail to contribute to scattering of light (see FIG. 6) so that the scattering efficiency of the liquid crystal layer decreases.

<Evaluation of Voltage Characteristic of Liquid Crystal Layer>

Alignment film A and alignment film B specified in Table above were used to fabricate liquid crystal cells for evaluation of the voltage characteristic (sample liquid crystal cell No. 7 and sample liquid crystal cell No. 8), and the voltage characteristic of these samples was measured. The evaluation method used and the results of the evaluation are described below.

The sample liquid crystal cells No. 7 and No. 8 were fabricated using the same method as the above-described sample liquid crystal cells No. 5 and No. 6. Note that, however, the thickness of the liquid crystal layer of the respective cells was adjusted such that the transmittance for light which was incident on the liquid crystal layer in a direction normal to the substrate (incidence angle: 0°) in the absence of an applied voltage was generally equal in these cells, i.e., such that the brightness of the white display state was generally equal in these cells. Specifically, the thickness of the liquid crystal layer of the sample liquid crystal cell No. 7 was 4.1 μm, and the thickness of the liquid crystal layer of the sample liquid crystal cell No. 8 was 3.4 μm.

The respective cells obtained using the above-described method were measured in terms of transmittance with a varying applied voltage, using an LCD evaluation apparatus manufactured by Otsuka Electronics Co., Ltd. (LCD5200). Here, light was supplied to be incident on the liquid crystal layer at the front substrate side in a direction normal to the substrate (incidence angle: 0°). Part of the incident light which traveled through the liquid crystal layer in a direction normal to the substrate to outgo at the rear substrate side (transmitted light) was measured in terms of intensity. The ratio of the intensity of the transmitted light to the intensity of the incident light was calculated, and is herein referred to as "transmittance (%)".

Figure 9:
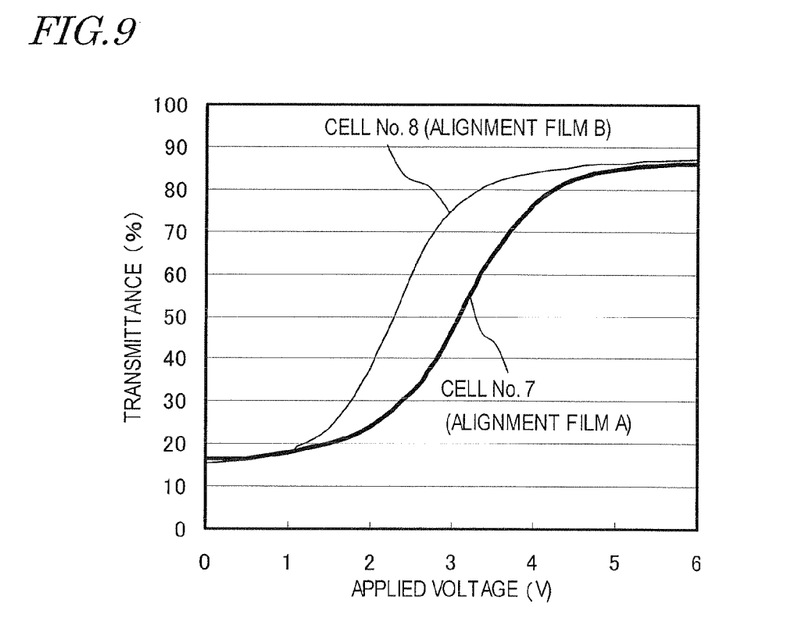
FIG. 9 A graph showing the result of measurement of the relationship between the applied voltage and the transmittance of the sample liquid crystal cell No. 7 including alignment film A and the sample liquid crystal cell No. 8 including alignment film B.

The measurement results are shown in FIG. 9. In the graph shown in FIG. 9, the abscissa axis represents the voltages applied to the respective cells. The ordinate axis represents the transmittance for light of incidence angle 0°.

From these measurement results, it is appreciated that, the sample liquid crystal cell No. 8 including alignment film B transitions to a light-transmitting state at a lower voltage than the sample liquid crystal cell No. 7 including alignment film A. This is probably because the thickness of the liquid crystal layer of the sample liquid crystal cell No. 8 is smaller than that of the sample liquid crystal cell No. 7, so that the state of the liquid crystal layer can be easily switched.

In the examples described above, to control the configuration of the small sections in the liquid crystal layer, an alignment film having a predetermined surface energy was selected. The surface energy of the alignment film may be controlled by reforming the surface of the alignment film using a monomolecular adsorption film, or the like. The preferred range of the surface energy of the alignment film may be on substantially the same order as the surface energy of the liquid crystal (e.g., the difference is 20% or less) and is not limited to the above-identified values of the surface energy of alignment film B.

Figure 10:
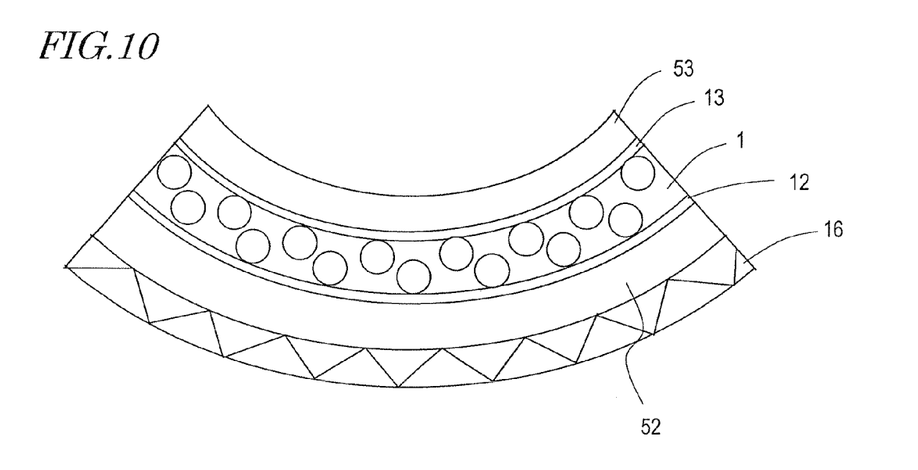
FIG. 10 A schematic cross-sectional view of another display device of the present embodiment.

The structure of the display device of the present embodiment is not limited to that shown in FIG. 1. The front and rear substrates may be plastic substrates or may be curved substrates. Alternatively, flexible substrates 52, 53 as shown in FIG. 10 may be used.

INDUSTRIAL APPLICABILITY

According to the present invention, in a reflection-type liquid crystal display device which includes a liquid crystal layer that is switchable between a light-scattering state and a light-transmitting state, the scattering efficiency of the liquid crystal layer in the light-scattering state can be improved. Therefore, the white display state can be brighter than that realized in the conventional example. Alternatively, the driving voltage can be decreased to a low level without decreasing the brightness of the white display state.

The present invention is applicable to a wide variety of reflection-type liquid crystal display devices and a wide variety of electric devices that include reflection-type liquid crystal display devices.

| REFERENCE SIGNS LIST | |
| --- | --- |
| 1 | liquid crystal layer |
| 2 | rear substrate |
| 3 | front substrate |
| 4 | pixel electrode |
| 5 | thin film transistor |
| 6 | color filter |
| 7 | planarization film |
| 8 | counter electrode |
| 10 | wall |
| 11 | liquid crystal region |
| 12, 13 | alignment film |
| 14 | small section |
| 16 | retroreflective layer |
| 20 | director |
| 22 | liquid crystal molecule |
| 24, 26 | light |
| 52, 53 | flexible substrate |
| 100 | liquid crystal display device |

The invention claimed is:

1. A reflection-type liquid crystal display device having a plurality of pixels, comprising:
 a liquid crystal layer whose state is switchable between a light-transmitting state in which light is transmitted through the liquid crystal layer and a light-scattering state in which light is scattered by the liquid crystal layer;
 a front substrate and a rear substrate between which the liquid crystal layer is held;
 a pair of electrodes between which the liquid crystal layer is interposed and which are configured to apply a voltage across the liquid crystal layer; and
 first and second alignment films respectively provided between the liquid crystal layer and the front substrate and between the liquid crystal layer and the rear substrate, wherein the liquid crystal layer includes, in each of the pixels, a continuous wall, a plurality of small sections separated by the wall, and
 a plurality of liquid crystal regions, each of which is formed in any one of the plurality of small sections, and
 the plurality of liquid crystal regions include first and second liquid crystal regions which have directors in a plane parallel to the liquid crystal layer, and the directors of the first and second liquid crystal regions are oriented in different directions.

2. The reflection-type liquid crystal display device of claim 1, wherein another small section does not intervene between each of the plurality of small sections and one of the first and second alignment films which is closer to the each small section.

3. The reflection-type liquid crystal display device of claim 1, wherein another small section does not intervene between each of the plurality of small sections and the first and second alignment films.

4. The reflection-type liquid crystal display device of claim 1, wherein each of the plurality of liquid crystal regions is in contact with any one of the first and second alignment films.

5. The reflection-type liquid crystal display device of claim 1, wherein the first and second alignment films are not provided with an alignment treatment.

6. The reflection-type liquid crystal display device of claim 1, wherein a surface free energy of the first and second alignment films is not less than 44 mJ/m$^2$ and not more than 50 mJ/m$^2$.

7. The reflection-type liquid crystal display device of claim 1, wherein the liquid crystal layer includes the small sections in each of the pixels at the density of 0.016 sections/μm$^2$ or higher.

8. The reflection-type liquid crystal display device of claim 7, wherein the liquid crystal layer includes the small sections in each of the pixels at the density of 1 section/μm$^2$ or higher.

9. The reflection-type liquid crystal display device of claim 1, wherein a dielectric anisotropy of a liquid crystal material of the liquid crystal layer is positive.

10. The reflection-type liquid crystal display device of claim 1, wherein the liquid crystal region does not contain a chiral agent.

11. The reflection-type liquid crystal display device of claim 1, wherein the plurality of small sections have a diameter not less than 0.6 μm and not more than 6 μm.

12. The reflection-type liquid crystal display device of claim 1, wherein a difference between an extraordinary refractive index ne and an ordinary refractive index no of the liquid crystal material included in the liquid crystal region is not less than 0.1 and not more than 0.3.

13. The reflection-type liquid crystal display device of claim 1, further comprising a reflective layer which is provided on a rear side of the liquid crystal layer.

14. The reflection-type liquid crystal display device of claim 13, wherein the reflective layer is a retroreflective layer.

15. The reflection-type liquid crystal display device of claim 1, further comprising a light-absorbing layer which is provided on a rear side of the liquid crystal layer.

* * * * *